No. 750,485. PATENTED JAN. 26, 1904.
J. PARKER.
GEAR CUTTING MACHINE.
APPLICATION FILED AUG. 23, 1897.

NO MODEL. 2 SHEETS—SHEET 2.

WITNESSES.
James H. Thurston
A. A. Bates

INVENTOR.
John Parker,
By Wilmarth H. Thurston,
Attorney

No. 750,485. Patented January 26, 1904.

UNITED STATES PATENT OFFICE.

JOHN PARKER, OF PROVIDENCE, RHODE ISLAND, ASSIGNOR TO THE BROWN AND SHARPE MANUFACTURING COMPANY, OF PROVIDENCE, RHODE ISLAND, A CORPORATION OF RHODE ISLAND.

GEAR-CUTTING MACHINE.

SPECIFICATION forming part of Letters Patent No. 750,485, dated January 26, 1904.

Application filed August 23, 1897. Serial No. 649,192. (No model.)

*To all whom it may concern:*

Be it known that I, JOHN PARKER, of Providence, county of Providence, State of Rhode Island, have invented certain new and useful Improvements in Gear-Cutting Machines; and I do hereby declare the following specification, taken in connection with the accompanying drawings, forming a part of the same, to be a full, clear, and exact description thereof.

The present improvements relate more especially to that class of gear-cutting machines which are used for cutting bevel-gears and in which the cutter-shaft is carried in a carriage which reciprocates on ways formed on a tilting bed, which bed is pivoted to a slide adjustably mounted on ways formed on the stationary bed or frame of the machine.

One feature of the present improvements relates to the means for adjusting the tilting bed about its pivot and comprises a web or arm depending from the said bed and provided with a segmental worm-gear which is engaged by a worm operated by any suitable means. By rotating the worm the tilting bed may be accurately moved in either direction about its pivot and will be held in its adjusted position by the worm and worm-gear without danger of displacement.

A further feature of invention relates to the means for clamping the adjustable slide to its ways and consists in providing a tapered gib between the slide and one or more of the ways and means for moving said gib or gibs longitudinally to rigidly clamp said slide in position.

Further features of invention relate to the means for driving the cutter-shaft and devices for clamping the adjustable tilting bed to secure rigidity, so that the cutting may be done more rapidly without danger of chattering.

Figure 1:
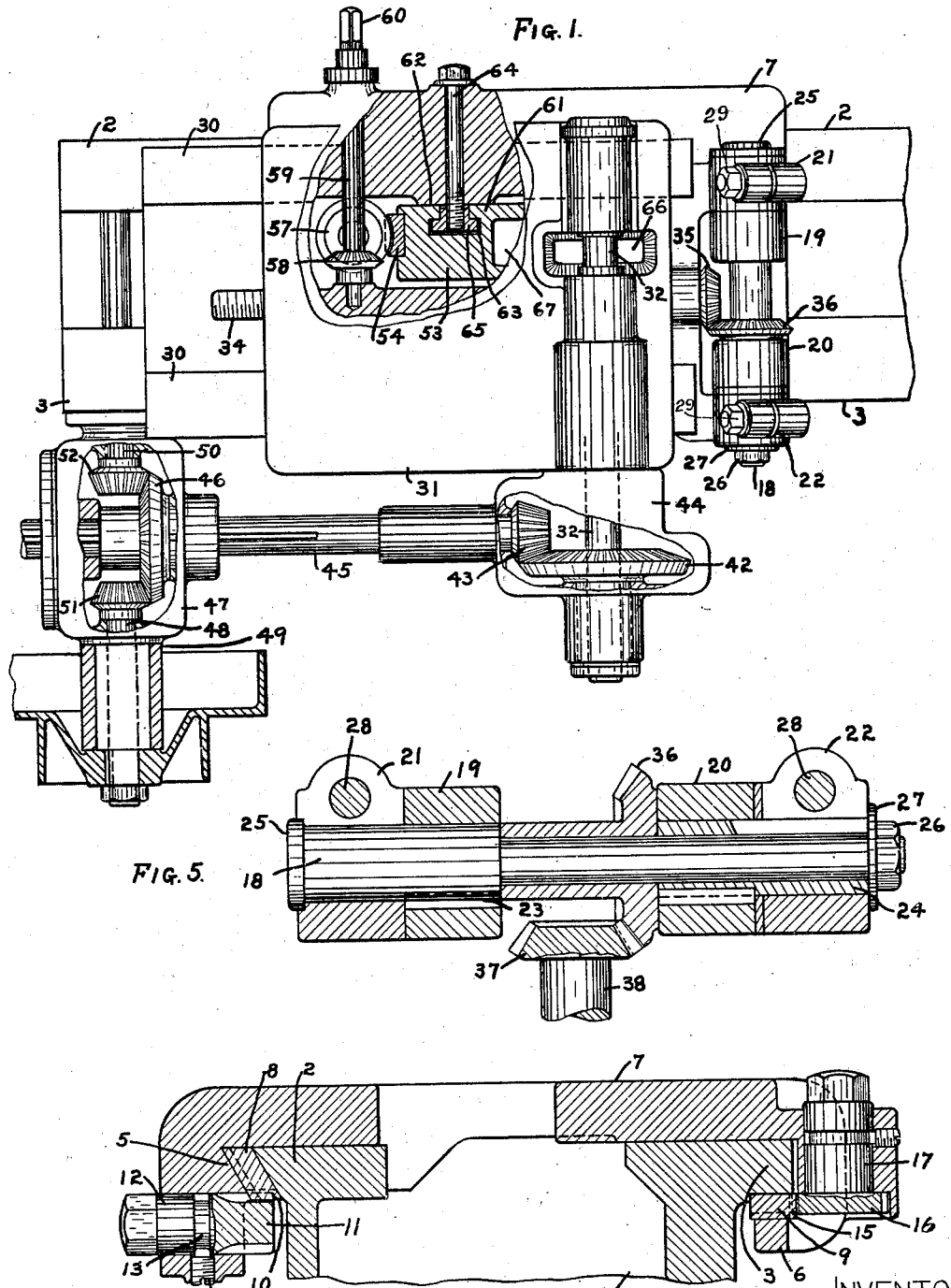
Figure 2:
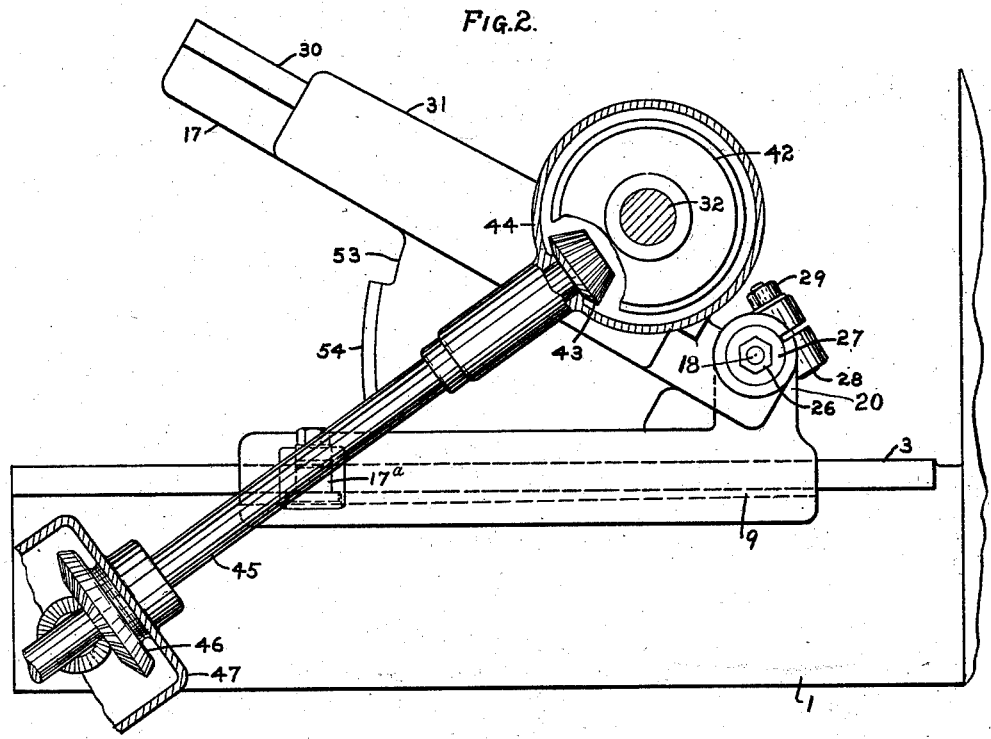
Figure 3:
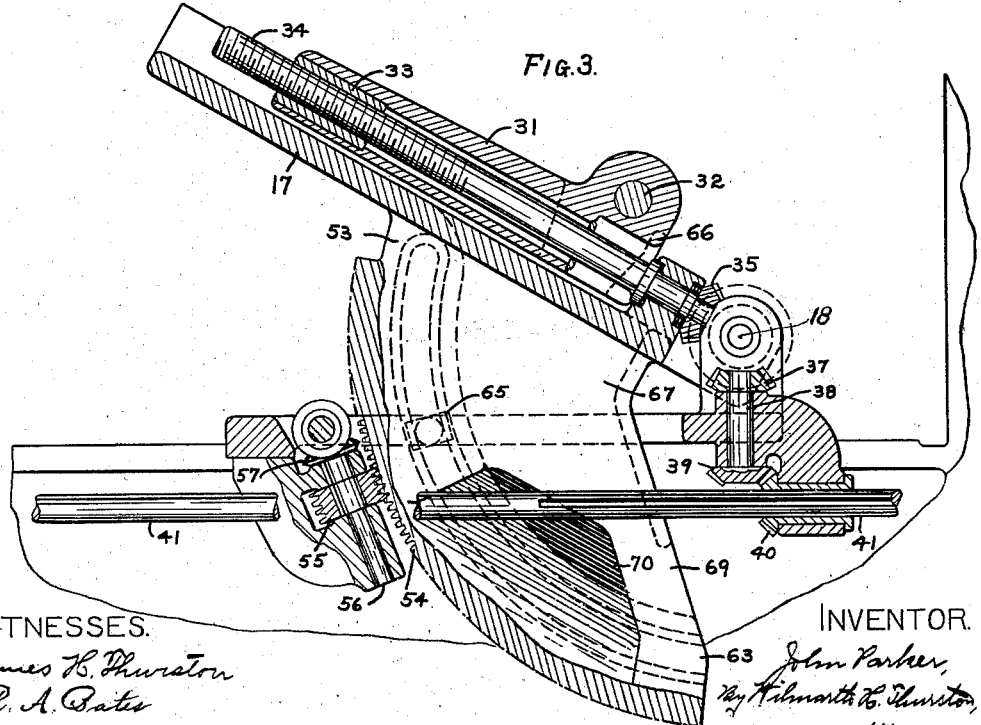

In the accompanying drawings, in which is illustrated so much of a bevel-gear-cutting machine as is necessary to show an embodiment of the present improvements in their preferred form, Figure 1 is a plan view. Fig. 2 is a side elevation. Fig. 3 is a longitudinal sectional elevation. Fig. 4 is a transverse section through the adjustable slide, and Fig. 5 is a section through the pivot of the tilting bed.

Referring to the drawings, the frame or bed 1 of the machine is provided with ways 2 and 3, which are engaged by ways 5 and 6 on a slide 7. The slide 7, which serves as a support for the tiltting bed, is adjustable on the ways 2 and 3 and is rigidly clamped to the frame after being adjusted by means of one or more tapered gibs which are interposed between one or both of the ways 2 and 3 and the ways 5 and 6. As shown in the drawings, the tapered gib 8 is interposed between the outer inclined surface of the way 2 and the corresponding surface of the way 5, and a second tapered gib 9 is interposed between the lower surface of the way 3 and the corresponding surface of way 6. The gib 8 is provided with a short rack 10 at one end, which is engaged by a pinion 11, formed on a stud 12, journaled in the slide 7. The stud 12 is grooved at 13 and is held in place by a screw 14, the end of which enters the groove 13. The end of the stud is hexagonal to receive a wrench by which the stud may be rotated to move the gib 8 in either direction. The gib 9 is also provided with a rack 15, engaged by a pinion 16, formed on a stud 17$^a$ similar to stud 12. By turning the studs 12 and 17 the gibs 8 and 9 may be withdrawn to unclamp the slide 7, which may then be adjusted on the ways 2 and 3, and by turning the studs in the opposite direction the gibs may be forced inward to securely clamp the slide in its adjusted position. By thus clamping the slide by means of tapered gibs the slide will be firmly secured to the frame throughout its entire length and rigidity of the parts thus secured.

A tilting bed 17 is connected to the slide 7 by means of a pivotal connection, which in the form shown consists of a stud 18, mounted in lugs 19 and 20, formed on the slide 7, and passes through ears 21 22, formed on the bed 17. The stud 18 is secured to the lug 19 by means of a key 23 and is reduced in diameter beyond said lug and passes through a split sleeve 24, keyed in the lug 20 and extending through the ear 22. The stud is provided with a head 25 and is held in place longitudinally by means of a nut 26 and washer 27. The ears 21 and 22 are split and may be sprung together to clamp the stud 18 by means of bolts 28, provided with nuts 29. The ear 21 is clamped directly to the stud, while the ear 22 is clamped to the stud through the split sleeve 24, which is compressed when the ear 22 is compressed. The bed 17 is thus rigidly secured to the stud 18, which is rigidly connected to the slide 7 by means of the key 23 and the sleeve 24, and any movement or vibration of the parts at this point is prevented. When the tilting bed is to be adjusted about its pivots, the nuts 29 are loosened, so that the ears 21 and 22 may turn on the stud 18.

While the above form of pivotal connection between the slide 7 and bed 17 is preferred, it will be understood that other forms may be used or other means for rigidly connecting the slide and bed to the pivotal connection might be used. Thus the stud 18 and the sleeve 24 might be rigidly secured to the ears 21 and 22 and the lugs 19 and 20 be split to form clamps, or the stud might be the same size throughout and the sleeve 24 dispensed with, or the bed might be pivoted on trunnions secured to either the bed or slide by being formed integral therewith or otherwise, or other forms of pivotal connection might be devised, all of which would fall within this feature of the present invention, which consists in rigidly securing the parts together at their pivotal point, so that there can be no relative movement of the parts at this point, and the bed will have substantially the same rigidity that it would have were it integral with the slide.

The bed 17 is provided with ways 30, upon which is mounted the cutter-carriage 31, which carries the bearings for the cutter-shaft 32. The carriage 31 is provided with a nut 33, engaged by a screw-rod 34, journaled in the bed 17 and provided with a bevel-gear 35 at its forward end. This gear is engaged by a bevel-gear 36, loosely mounted on the stud 18 and engaged by a bevel-gear 37 on a short shaft 38, mounted in the slide 7 and provided at its lower end with a bevel-gear 39. The gear 39 is engaged by a bevel-gear 40, journaled in the slide 7 and having a sliding connection with a shaft 41, suitably mounted in the frame 1 and driven first in one direction and then in the opposite direction by any suitable mechanism. Thus the shaft 41 acts through the connections described to reciprocate the cutter-carriage on the bed 17.

The cutter-shaft 32 is driven continuously during the reciprocation of the carriage 31 by the following mechanism: A gear 42 is secured to the end of shaft 32 and is engaged by a gear 43, journaled in a support 44, which is pivoted upon the shaft 32 and the hub of gear 42 and is free to swing about said shaft as an axis. The gear 43 is connected to a shaft 45, journaled in the support 44 and extending through a gear 46, which is mounted in a support 47, pivoted on a driving-shaft 48, mounted in a stationary bearing 49 and on a shaft 50 in line with shaft 48. A gear 51 is secured to the shaft 48 and engages and drives the gear 46. The shaft 45 has a sliding connection with the gear 46 by means of a key and keyway. A gear 52 is secured to shaft 50 and is driven through the gear 46, the shaft 50 serving to drive other parts of the machine (not shown) and forming no part of the present improvements. As the carriage reciprocates the supports rock about the axes of the shafts 32 and 48, and the shaft 45 slides back and forth through the gear 46, and the cutter-shaft is constantly driven from the driving-shaft 48. It is obvious that the shaft 45 could be arranged to slide through the gear 43 instead of through gear 46 or a telescoping shaft could be used to connect the gears 43 and 46.

The bed 17 is provided with a depending arm 53, which is provided on its outer periphery with a segmental worm-gear 54, which is engaged by a worm 55, secured to a shaft 56, journaled in the slide 7. A gear 57 is secured to the shaft and is engaged by a gear 58, secured to a transverse shaft 59, also journaled in the slide 7 and provided with a squared end 60, to which a crank-handle may be applied for manually operating said shaft. By turning the shaft 59 the tilting bed may be adjusted about its pivot and will be held in its adjusted position by the worm and worm-gear. The depending arm 53 is also provided with an engaging surface 61, which is arranged to slide past a surface 62 on the slide 7 as the bed 17 is adjusted about its pivot. An undercut groove 63 is formed in the arm 53, and a bolt 64 passes through the slide 7 and engages a nut 65 in said groove, and said nut and bolt serve as a means for clamping the surfaces 61 and 62 together. The arm 53 is located directly in the rear of the cutter, so that it will more directly support said cutter and hold the cutter more rigidly up to the work.

An opening 66 is formed in the carriage 31 directly under the cutter, through which the chips formed by the cutter and the oil used during the cutting may pass. This opening registers with a passage 67 in the arm 53 as the carriage reciprocates, which passage forms a chute for conducting the chips and oil to a receptacle placed to receive them. When the bed 17 is at a steep incline, the chips and oil will pass out of the end 69 of the passage 67;

but at other times they will pass through the lateral opening 70 formed through the side of the arm 53.

What I claim as my invention, and desire to secure by Letters Patent, is—

1. In a gear-cutting machine the combination, with a tilting bed, of a cutter-carriage mounted to reciprocate thereon, a segmental arm extending from said tilting bed and located directly in the rear of the cutter, and means for clamping said arm in adjusted position, whereby the cutter is rigidly supported in line with the resistance thereto and is held rigidly up to the work.

2. In a gear-cutting machine the combination, with an adjustable slide, of a tilting bed pivoted on said slide, a cutter-carriage mounted to reciprocate on said bed, a segmental arm extending from said tilting bed and located directly in the rear of the cutter, and means for rigidly clamping the arm to said slide in any of its adjusted positions.

3. In a gear-cutting machine the combination, with an adjustable slide, of a tilting bed pivoted thereon, a cutter-carriage mounted to reciprocate on said bed, a segmental arm extending from the tilting bed directly in the rear of the cutter, an engaging surface on the slide arranged to engage the side of said arm, an undercut groove in the side of said arm, and a nut and bolt for clamping the arm to said engaging surface.

4. In a gear-cutting machine the combination with a bed having guiding-ways, of an adjustable slide mounted on said ways, a reciprocating cutter-carriage supported on said slide, tapered gibs between said ways and said slide and devices for moving said gibs to clamp said slide to the bed throughout its length.

5. The combination with a bed 1 having ways 2 and 3, a slide 7 mounted thereon having ways 5 and 6, a tapered gib 8 between ways 2 and 5, a tapered gib 9 between ways 3 and 6, and means for forcing said gibs longitudinally.

6. The combination of a tilting bed, a cutter-carriage mounted to reciprocate on said bed, a support for said tilting bed, a pivotal connection between said support and bed rigidly connected to one of said parts, and means for rigidly connecting the other part to said connection.

7. The combination of a tilting bed, a cutter-carriage mounted to reciprocate on said bed, a support for said bed, a pivotal connection between said support and bed rigidly connected to said support, and means for rigidly connecting said bed to said connection.

8. The combination of a tilting bed, a cutter-carriage mounted to reciprocate thereon, a rigid stud on which said table is pivoted, means for adjusting said bed about said stud, and means for clamping said bed to said stud.

9. The combination of a tilting bed provided with split ears, a support provided with lugs, a stud passing through said ears and lugs, and secured to one of said lugs, a split sleeve surrounding said stud and passing through one of said ears and the other of said lugs, and means for springing together the split ears.

10. The combination of a tilting bed, a cutter-carriage mounted to reciprocate thereon, an arm depending from said bed, and a chip-chute formed in said arm.

11. The combination of a tilting bed, a cutter-carriage mounted to reciprocate thereon and having an opening therein under the cutter, an arm depending from said bed, and provided with a chip-chute, with which said opening registers.

12. The combination of a tilting bed, a cutter-carriage mounted to reciprocate thereon, an arm depending from said bed, and a chip-chute in said arm provided with a lateral opening.

JOHN PARKER.

Witnesses:
 R. A. BATES,
 W. H. THURSTON.